United States Patent [19]

Parmann

[11] 4,368,894
[45] Jan. 18, 1983

[54] REINFORCED SEALING RINGS FOR PIPE JOINTS

[75] Inventor: Gunnar Parmann, Alvøy, Norway

[73] Assignee: Rieber & Son, Bergen, Norway

[21] Appl. No.: 265,245

[22] Filed: May 19, 1981

[30] Foreign Application Priority Data

May 22, 1980 [NO] Norway ................................ 801521

[51] Int. Cl.³ .......................... F16J 15/12; F16J 15/32
[52] U.S. Cl. ............................... 277/166; 277/207 A; 277/209; 285/110; 285/231; 285/345
[58] Field of Search ............... 277/164, 166, 189, 165, 277/207 R, 207 A, 208–210; 285/110, 230, 231, 232, 235, 237, 345

[56] References Cited

U.S. PATENT DOCUMENTS

| | | | |
|---|---|---|---|
| 3,163,432 | 12/1964 | De Boer | 277/207 A |
| 3,368,830 | 2/1968 | French | 277/207 A X |
| 3,507,505 | 4/1970 | Muhlner et al. | 285/345 X |
| 3,510,139 | 5/1970 | Potter | 285/231 X |
| 3,744,806 | 7/1973 | Keyser | 277/164 X |
| 3,997,989 | 12/1976 | Stepe | 277/164 X |

FOREIGN PATENT DOCUMENTS

| | | | |
|---|---|---|---|
| 269542 | 8/1966 | Australia | 277/207 A |
| 1475579 | 1/1969 | Fed. Rep. of Germany | 277/207 A |

*Primary Examiner*—Robert S. Ward, Jr.
*Attorney, Agent, or Firm*—Kenyon & Kenyon

[57] ABSTRACT

Reinforced sealing ring for reception in a pipe joint between an annular groove-carrying socket end and an insert end. The sealing ring consists of a main body of rubber in which there is embedded an upsplit steel ring. The sealing ring is adapted to be elastically deformable to such a degree that it can be snapped into place in the annular groove of the socket end by a simple mounting operation while it can be prevented from being torn or pressed unintentionally outwards from the annular groove after mounting. In order to achieve this the main body has a largest external diameter of between 1.08D+16 mm and 1.04D+8 mm, while the cross-sectional diameter or thickness of the steel ring is between 0.01D+2 mm and 0.005D+1 mm, where D constitutes the diameter of the pipe. The steel ring is disposed embedded in a central and/or radially outer cross-sectional portion of the main body.

9 Claims, 8 Drawing Figures

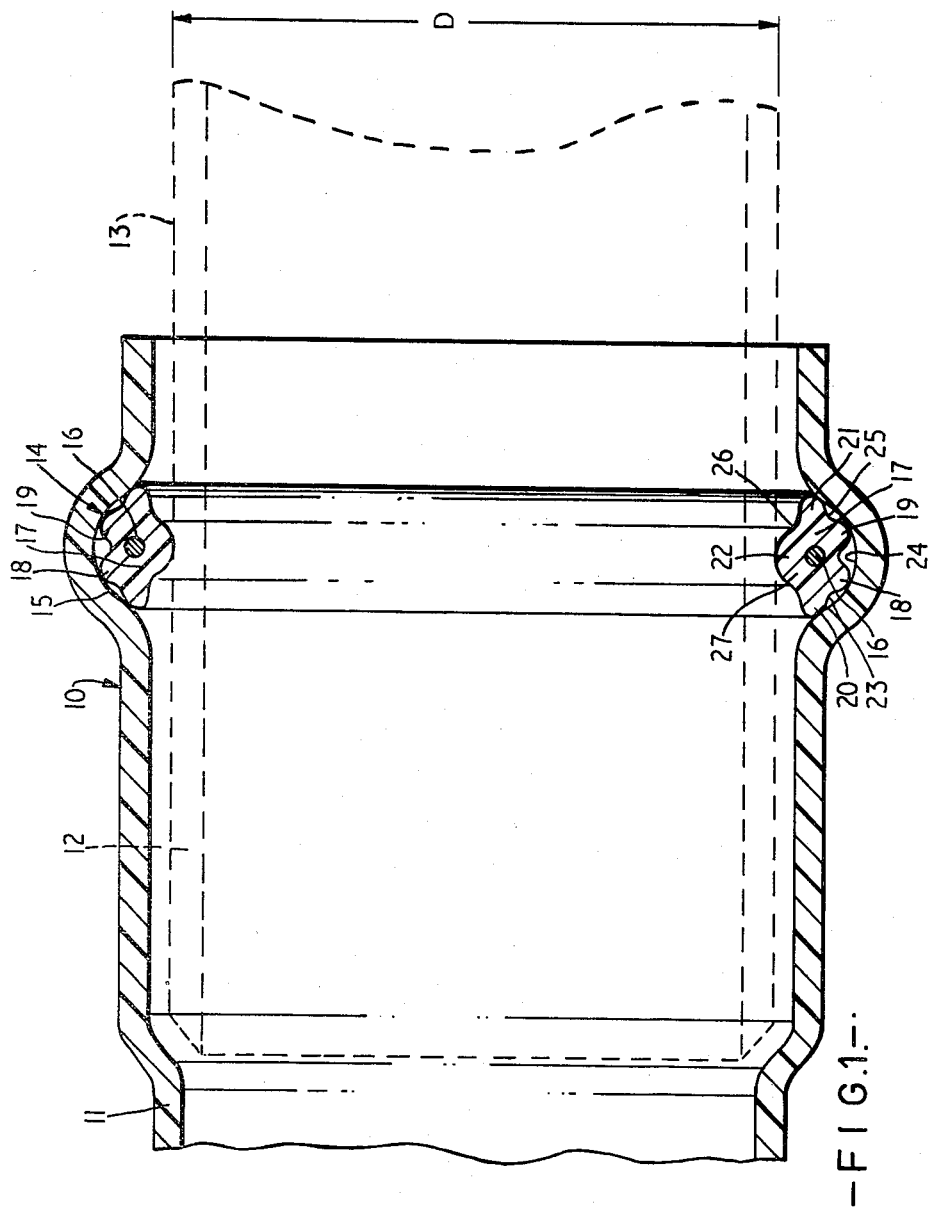

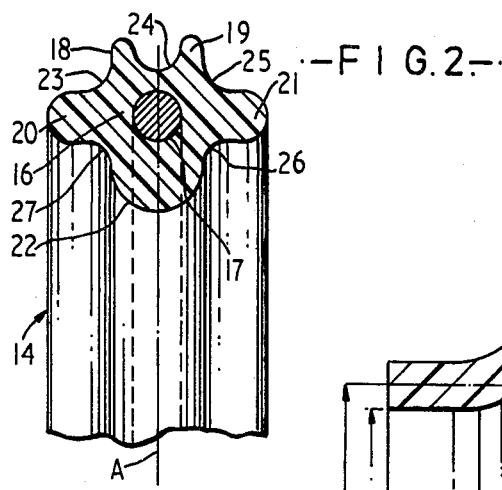
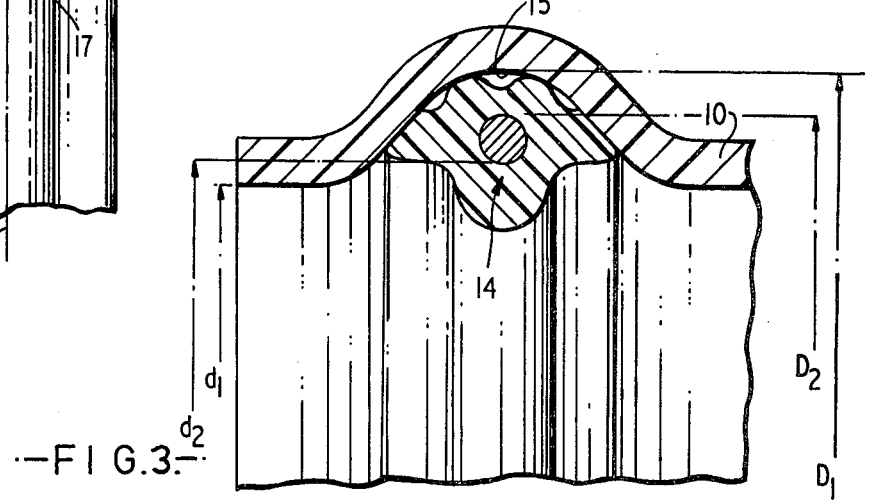
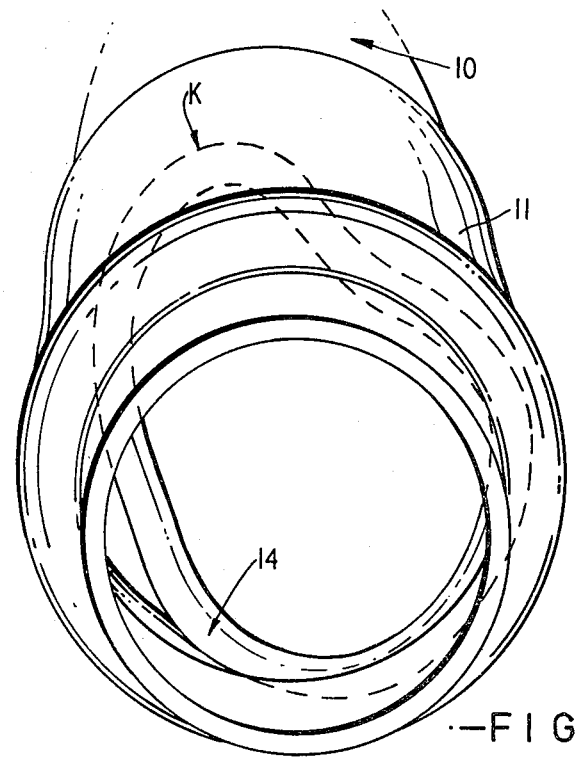

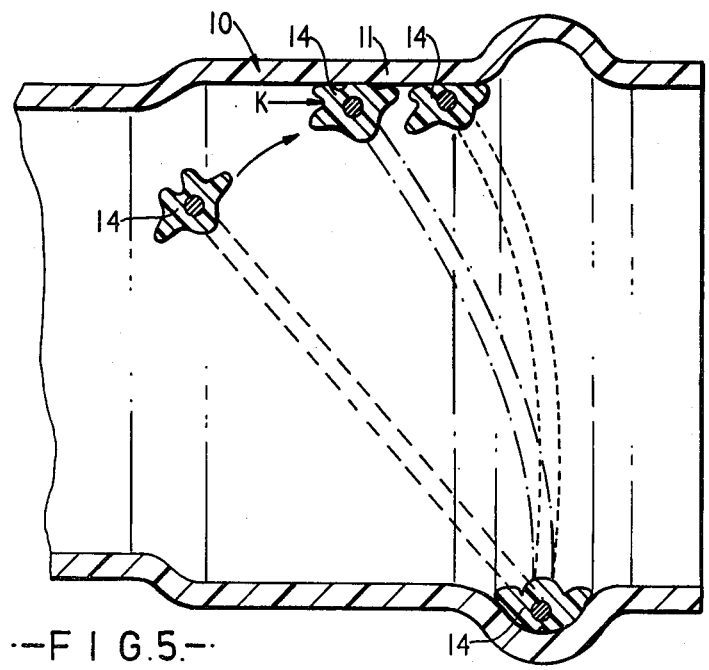
FIG.5.
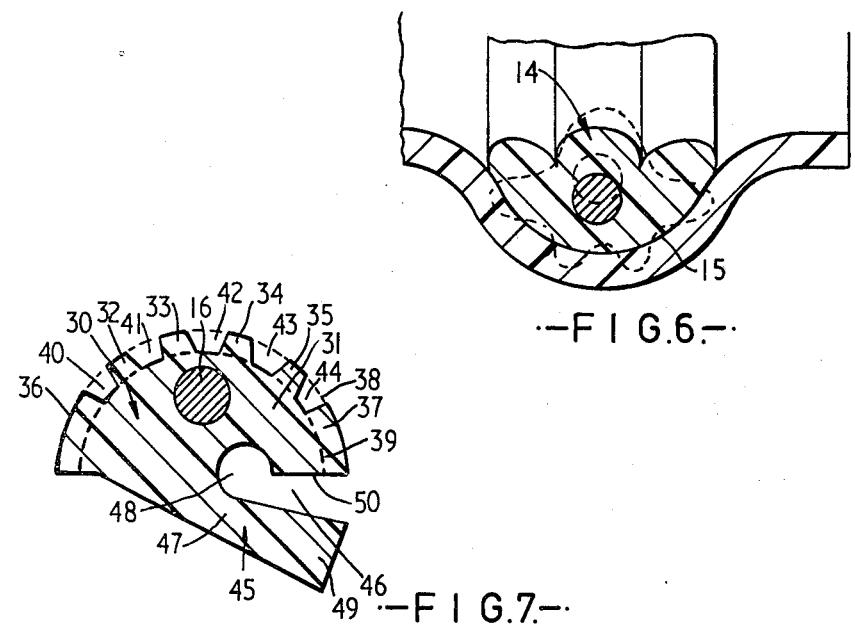
FIG.6.
FIG.7.

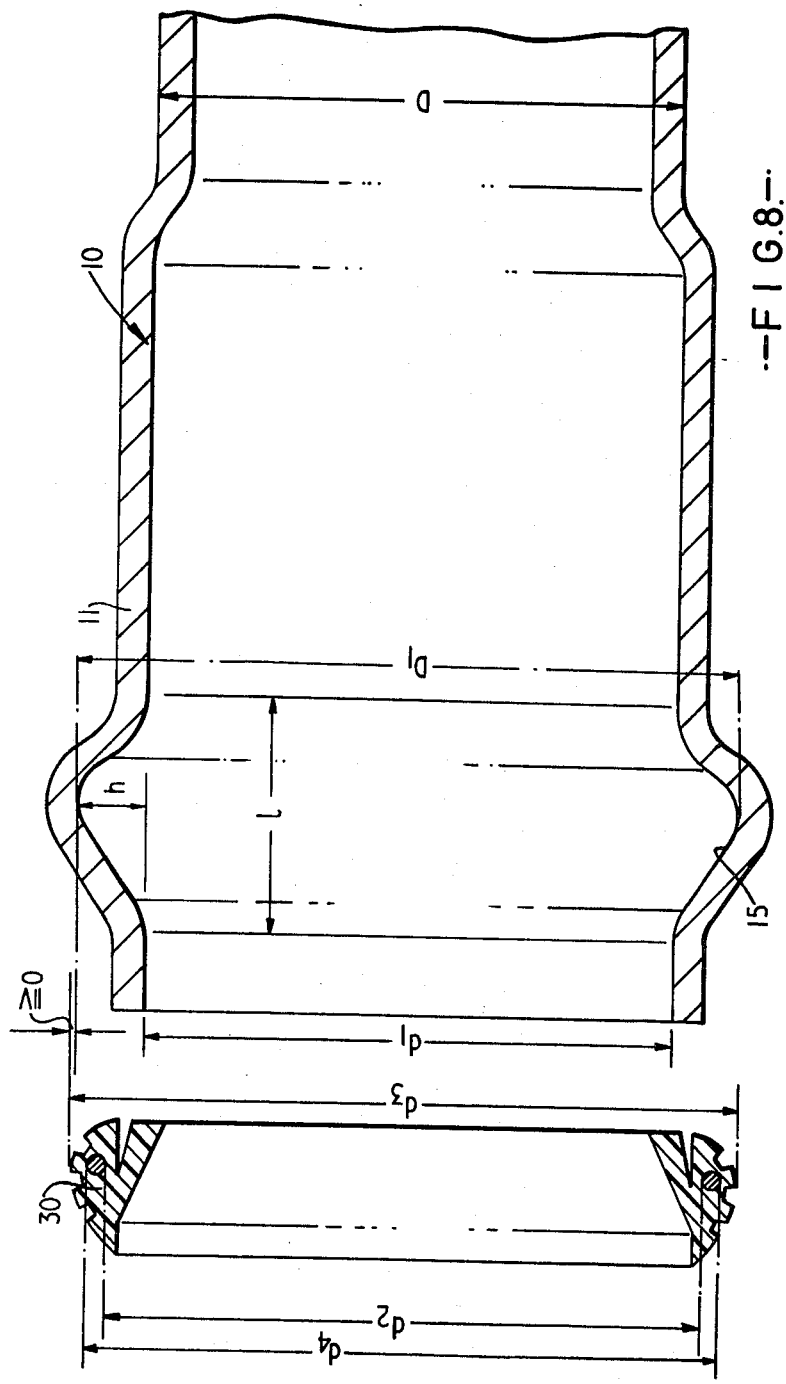

REINFORCED SEALING RINGS FOR PIPE JOINTS

This invention relates to reinforced sealing rings for reception in pipe joints between an annular groove-carrying socket end and insert end, the sealing ring consisting of a main body of elastically yielding material, such as rubber, having an unsplit reinforcing steel ring embedded therein.

On joining pipes together, in the size range of from fifty to two thousand millimeters diameter, and especially pipes for the supply and discharge of water, most often pipes are utilised with a socket end at one end of the pipe and with a straight insert end at the opposite end. The socket end is usually provided with an internal annular groove for reception of a sealing ring which is to form a seal in the pipe joint, that is to say a first seal between the sealing ring and annular groove of the socket end and a second seal between the sealing ring and the insert end. The joining together is effected by pushing in an insert end in a socket end, while the sealing ring is received in the associated annular groove in the socket end.

A usual problem with such a method of jointing is that the sealing ring allows itself to be pushed out of position far too easily on joining together.

When the sealing ring is already inserted in the annular groove of the socket at the factory, so that the pipes can be delivered ready mounted, there occur little problems in that grit, sand and the like collect in the annular groove during transportation and storage. Such foreign bodies can easily penetrated into the sealing area between rubber ring and annular groove, something which can lead to leakages after the pipes are mounted together and put into use. Such leakages will be able to increase with time and finally lead to total rupture of the pipe joint due to outwardly leaking medium stirring up grit, mud etc. which wears and tears at the pipe material.

On manufacturing socket ends of thermoplastic pipes a method has been developed where the socket end is moulded directly to the sealing ring per se (Norwegian Pat. No. 133,818 and U.S. Pat. No. 4,030,872) by allowing the sealing ring to be employed initially as a mould element, so that the sealing ring, after the socket end of the pipe is finally formed and cooled off in the desired shape, remains locked in place in the socket end in the desired position due to the pipe being shrunk on to the ring and gripping around the latter. By such a manufacturing process, the displacement of the sealing ring out of position can be completely avoided on pushing in the insert end into the socket end, and there occurs such a good gripping force between socket and sealing ring that impurities cannot penetrate into the sealing area of the ring.

In the cases where the socket ends are formed in a conventional manner, so that the sealing ring is not simultaneously locked in position (steel pipes, concrete pipes, plastic pipes etc.), it is current to insert the sealing ring in the associated annular groove in the socket end either at the location of use itself or just after the socket end is formed at the factory.

With this type of insertion of the sealing ring it has been usually understood that the sealing ring must be relatively flexible in order to be mountable in place in the socket end. In this case it has been difficult to get the sealing ring to sit as well secured in the annular groove of the socket as desirable.

Conventional solutions consist in the rubber ring with a support ring of thermoplastic material or a moulded-in spiral spring, something which leads to a better anchoring of the sealing ring than by using a non-reinfoced or supported ring.

However, in the known solutions, bracing bodies are exclusively employed which by virtue of shape or material are still very flexible, and which thus can be mounted in the same manner as unreinforced rings without special demands on the construction of ring, socket groove or on the mounting.

In the known solutions, securing the sealing element in place in the desired position has only been achieved to a small degree by inserting the pointed end. Further a desirably good clamping of the sealing ring radially outwards against the internal surface of the annular groove in order to prevent impurities penetrating here has not been achieved.

With the present invention, the aim is to avoid the aforementioned problems by employing a sealing ring which is provided with far more rigid reinforcement than those which have hitherto been employed in connection with sealing rings which are to be inserted in prefabricated socket ends.

Primarily, the aim is to employ as reinforcement, steel rings have a compact cross-section.

Preferably, there will be employed steel rings having circular or approximately quadratic cross-section so as to achieve thereby large ring rigidity, but at the same time also a shape which can be manufactured with a great degree of accuracy and narrow tolerances in a relatively simple, conventional manner.

It will also be possible to manufacture reinforcement rings by spinning up thinner steel threads on a core at the same time as the individual threads are fastened to each other with a suitable adhesive agent (for example, rubber) Such reinforcement rings which are composed of a series of threads form together a ring with great ring rigidity.

By utilizing reinforced sealing rings having great ring rigidity there can be achieved a very solid anchoring of sealing rings in the socket together with a very good securement of rubber bodies against the internal surface of the groove.

A condition for achieving the desired advantages is, however, that the sealing ring be designed so that it allows itself to be mounted in a simple manner without the rigid steel reinforcement causing undesired permanent deformation.

As required for insertion and/or replacement of sealing rings outside in the field, it is essential that this can be carried out by simple means and, preferably, with a simple hand grip.

According to the invention the afore-mentioned advantages can be achieved by designing the sealing ring and the associated reinforcement in a manner where the individual main parameters are maintained in a specific relationship to each other.

These main parameters are the radial outer diameter and shape of the rubber body together with the cross-sectional surface and shape of the bracing ring and ring diameter.

Accordingly, the present invention resides in a reinforced sealing ring for reception in a pipe joint between an annular groove-carrying socket end and an insert end. The sealing ring consists of a main body of elastically yielding material and an unsplit reinforcing steel ring embedded in the main body. The main body has an outer surface which is substantially convexly curved in the axial direction of the sealing ring and has a largest external diameter between 1.08+16 mm and 1.04D +8 where D constitutes the diameter of the pipe. The steel ring has a cross-sectional diameter or thickness of between 0.01D+2 mm and 0.005D+1 mm and is located in a central and/or radially outer cross-sectional portion of the main body.

A sealing ring according to the invention will have a very large ring rigidity in relation to ordinary sealing rings, but can, nevertheless, be inserted in the associated annular groove in a relatively simple manner, as will be explained in the following description.

To the outermost surface of the sealing ring and/or internal surface of the annular groove is applied, first, a water-soluble friction-reducing agent in the form of soap, glycerine etc. Thereafter, the sealing ring is squeezed (in an elastically yielding manner) into a somewhat oval shape so that it allows itself to be guided into the socket end and is located thereafter with an outer portion of its periphery in the bottom of the annular groove of the socket where it is supported as a consequence of the shape of the groove.

The remaining peripheral portion of the sealing ring is pressed and supported against the internal surface of the socket by being drawn axially in a direction towards the annular groove of the socket.

As a consequence of the design of the sealing ring, it will be able to have a bent shape within contours of the annular groove so that the diameter of the steel ring is reduced without there occurring, as a result, such large bends that the steel ring gets undesired, permanent deformation. As a consequence of the reduced friction and the adapted shape of the surface of the sealing ring, steel reinforced sealing rings having relatively large rigidity can allow themselves to be pressed into the peripheral groove of the socket, even by moderate traction forces, so that the insertion can be affected manually without necessary use of extra auxiliary means.

As a consequence of the ability of the steel ring to receive long bends without getting permanent deformations and the reduced friction between annular groove and rubber, the peripheral portion which is pressed into the groove last, will snap into place at the same time as the sealing ring straightens itself out and tightens against the peripheral groove with a desired force.

By designing the annular groove with a bell-shape axial cross-sectional profile, the ring will center itself, as it slides into place in the groove adapted therefor.

Since it is essential to prevent permanent deformation of the steel or bracing ring of the sealing ring, it is of importance that the bracing ring has a stable and uniform cross-section so that there can be achieved a uniform, elastic deformation distributed over a large area of the peripheral limits of the bracing ring.

Possibly, the occurrence of sharp deformations in the bracing ring will not ease to a substantial degree the insertion of the sealing ring in the annular groove of the socket end and will, in all instances, produce or cause to be produced defective sealing between the sealing ring and the adjacent annular groove or between the sealing ring and the adjacent insert end in a pipe joint.

In order to ensure an effective seal between sealing ring and annular groove in the socket end after the insertion of the sealing ring, at the same time as an easy insertion of the sealing ring in the annular groove is to be allowed, the outer surface of the rubber body can have two or more mutually parallel rib formations coaxial to the sealing ring.

It is preferred in a first embodiment that the main body, in addition to two mutually parallel, annularly shaped rib formations which are disposed one on each respective side of a radial plane through the steel ring, is provided with two oppositely directed rib formations, one at each ring edge, and a radially inwardly directed rib formation which forms a main sealing surface of the sealing ring against the insert end of the pipe joint, there being formed between the rib formations concave annular grooves.

It is preferred in a second embodiment that the main body, in addition to a series of mutually parallel, radially relatively short rib formations on the outer surface of the sealing ring, is provided with a relatively elongate, lip seal-forming rib formation on the inner surface of the sealing ring, the lip seal-forming rib formation projecting obliquely inwards from one edge of the sealing ring over towards the opposite edge of the sealing ring.

In order that the invention can be more clearly understood, convenient embodiments thereof will now be described, by way of example, with reference to the accompanying drawings in which:

FIG. 1 is a longitudinal cross-section of a pipe socket end with associated sealing ring of a first embodiment mounted in place in the latter, showing in broken lines the insert end of a corresponding pipe pushed into place in the socket end to form a pipe joint, FIG. 2 is a cross-section of a part of the sealing ring of FIG. 1 shown in an unloaded condition, FIG. 3 is a fragmentary cross-section showing the sealing ring of FIG. 1 mounted in place in a loaded condition in an annular groove of a pipe socket end, FIG. 4 is a perspective view of the sealing ring of FIG. 1 pushed in an oblique position in the pipe socket end, ready for mounting in the annular groove of the socket end, FIG. 5 is a longitudinal cross-section of a pipe socket end showing schematically by broken, chain and dotted lines, the bracing ring in various phases of mounting of the sealing ring in the annular groove, there being indicated schematically at the same time the deformation of the rubber body at the support portion and the opposite portion which is exposed to a pushing force, FIG. 6 is a fragmentary cross-section showing a detail of the support portion of the sealing ring during a final phase of the mounting illustrated in FIG. 5, FIG. 7 is a cross-section showing a second embodiment of the sealing ring, and FIG. 8 is a cross-section of a third embodiment of the sealing ring and a longitudinal cross-section of an associated pipe socket end.

Referring to FIG. 1, there is shown, in full lines, a first pipe end in the form of a socket end 10 of a first pipe 11 and, in broken lines, a second pipe end in the form of an insert end 12 of a second pipe 13 having an outer diameter D and which forms part of a pipe joint together with the first pipe 11. The pipe joint is sealed off by means of a simple sealing ring 14. The sealing ring 14 is locked in place in an internal annular groove 15 in the socket end 10 so that the insert end 12 can be pushed into place in the illustrated position without pushing the sealing ring out of the intended position.

It is evident from FIG. 1 that the sealing ring consists of a reinforcing rigid core in the form of a steel or bracing ring 16 having a circular cross-section (quadratic or another similar cross-section is also appropriate) together with a main body 17 of elastically yielding material which completely surrounds the steel ring. In the illustrated embodiment, the main body 17 has two convexly rounded-off rib formations 18, 19 which are disposed on the outer surface of the sealing ring each on its respective side of a radial plane A (FIG. 2) through the bracing ring 16 and two convexly rounded-off rib formations 20, 21 which are disposed at each respective side edge of the sealing ring and a convexly rounded-off projection 22 which is disposed on the inner surface of the sealing ring axially within the bracing ring 16. The rib formations 18–21 and the projection 22 extend annularly concentric to the bracing ring 16 and are mutually limited by concavely rounded-off grooves 23–27. The rib formations 18–21 form a seal between the sealing ring and the annular groove 15 of the socket end 10 in the first pipe 11, while the projection 22, which includes significantly more material than the rib formations, forms a seal against the insert end 12 of the second pipe 13. (In practice, the projection 22 is somewhat squeezed together by the insert end 12, while in the drawing it is shown in an unloaded condition.)

The sealing ring is shown in detail in FIG. 2, and it is evident that the two rib formations 18, 19 have a substantially smaller mass (smaller height and smaller breadth) than the rib formations 20, 21 which in turn have a substantially smaller mass (smaller breadth) than the projection 22. From FIG. 3 it is evident that the elastic deformation of the rib formations 18, 19 (with the sealing ring in position in the annular groove 15) is significantly greater than the elastic deformation of the rib formations 20, 21. There are ensured annular pressure load pockets defined between the annular groove 15 and the grooves 23–25 in the whole periphery of the sealing ring.

From FIG. 3, it is evident that the cross-sectional diameter of the bracing ring 16 constitutes approximately 20% of the middle thickness of the sealing ring 14. If desired, it can have a thickness which is expressed by the actual pipe diameter D lying between the limit values 0.01D plus 2 millimeters and 0.005D plus 1 millimeter depending upon various degrees of flexibility of the elastic mass, various needs for sealing pressure etc.

In the illustrated embodiment, the reinforcing ring 16 is arranged centrally in the main body 17, that is to say both axially and radially, but will in practice only be placed axially displaced and/or radially displaced in the main body.

From FIG. 8, it is evident also that internal socket pipe diameter $D_1$ in the groove 15 is somewhat larger than (and in practise highly alike) external diameter $d_4$ of the bracing ring 16, while the least internal socket diameter $d_1$ (at the side of the groove 15) is somewhat less than (and in practice highly like) internal diameter $d_2$ of the reinforcing ring 16.

The rubber body has a radial thickness which lies between the two limit values 0.05D plus 10 millimeters and 0.02D plus 5 millimeters, where D is the pipe diameter.

In the illustrated embodiment with the bracing ring 16 arranged centrally in the main body and with the afore-mentioned dimensions one has a sealing ring having great ring rigidity at the same time as the bracing ring allows itself to be deformed elastically to a sufficient degree to make possible mounting in the annular groove of the socket. The mounting is assisted further by the ribs 18–21 which lead to greater elasticity of the rubber body during the mounting.

As shown in FIG. 4, it is possible to push the sealing ring in a relatively easy manner obliquely into the socket end to a position with the outermost portion arranged in a support position in the bottom of the annular groove 15 of the socket end, without thereby causing permanent deformation of the steel reinforcement. After previously having impregnated the annular groove 15 and/or the sealing ring with soap or similar water-soluble lubricating agent, one can, by exerting a pushing force K in a direction towards the annular groove, elastically deform the main body and the bracing ring, as is indicated in FIGS. 4 and 5. During the mounting operation, which is made clear by the various positions of the sealing ring in FIG. 5, taken together with that which is shown in FIG. 4, it is evident that one has squeezed flat certain portions of the rib formations of the main body and adjacent portions and that the bracing ring has been locally bent in different planes. Immediately the sealing ring has passed the last obstacle in the position which is shown in dotted lines, elasticity in the bracing ring and rib formations of the main body (and if desired in the pipe cross-section) is released so that the sealing ring slips into place in the intended central position in the annular groove 15. In FIG. 6, there is shown, in broken lines, the sealing ring in an unloaded condition relative to the associated annular groove and, in full lines, there is shown the sealing ring in a maximum tightened and maxium deformed condition with support abutment against the bottom of the annular groove.

In FIG. 7, there is shown another construction of the sealing ring where the sealing ring 30 is formed with a corresponding bracing ring 16 as shown in FIG. 1 embedded in a main body 31. The outer surface of the main body is provided with four central relatively narrow rib formations 32–35 and two outer relatively broad rib formations 36, 37 whose outer surfaces extend along a convexly curved arc 38 concentrically with a concentric arc 39 througon the bottom portions of intermediate grooves 40–44. From one edge portion of the sealing ring, there extends a lip-forming projection 45 sideways and obliquely downwards from the underside of the sealing ring to define an intermediate gap 46 between the projection 45 and the underside of the sealing ring at the opposite edge portion. In the illustrated embodiment, the rib formations 32–35 have substantially smaller breaths than the rib formations 36, 37 and the projection 45, while the rib formations 32–37 have substantially smaller heights than the length limit of the projection 45 as shown in FIG. 7. The projection 45 extends in unloaded condition, as shown in FIG. 7, key-shaped inwards towards an inner neck portion at 47. On pushing in the insert end (from the left in FIG. 7) into a socket end with the sealing ring 30 in position in the associated annular groove, parts of the projection 45 especially at the neck portion 47 are deformed elastically inwards into a cavity 48 on the underside of the sealing ring, while the outermost, broadest portion 49 of the projection 45 can be squeezed against a flat underside surface 50 on the underside of the sealing ring at the same time as this outer portion 49 is elastically deformably squeezed together. With this shape for the lip seal between the sealing ring and the insert end, it is possible to ensure sealing even with especially large deviations between the socket end and the insert end. With lip seals, the radial thickness of the rubber body of the sealing ring, such as previously defined, will not include the air gap between the main body of the ring and the lip portion.

As a consequence of the good anchoring of the sealing ring which can be achieved according to the invention, the outermost portion of the socket can be constructed with a somewhat larger diameter than on the opposite side of the annular groove so that the point there can be more angled-off than with conventionally designed sockets where the internal diameter of the socket is the same on both sides of the annular groove.

In FIG. 8 there are shown certain preferred dimensions between the sealing ring and the annular groove. Internal socket diameter $d_1$ is less or equal to the internal diameter $d_2$ of the steel ring 16 of the sealing ring. The internal diameter $d_1$ plus 2 h of the groove, i.e. the internal diameter $D_1$ of the groove 15, is preferably equal to or less than the outer diameter $d_3$ of the sealing ring. The axial length 1 of the groove is preferably equal to or greater than double the depth h of the groove.

I claim:

1. Reinforced sealing ring for reception in a pipe joint between an annular groove-carrying socket end and an insert end, said sealing ring consisting of a main body of elastically yielding material having an unsplit reinforcing steel ring embedded therein, said main body having an outer surface which is substantially convexly curved in the axial direction of said sealing ring and having a largest external diameter between $1.08D + 16$ mm and $1.04D + 8$ mm where D constitutes the diameter of the pipe and said steel ring having a cross-sectional diameter or thickness of between $0.01D + 2$ mm and $0.005D + 1$ mm and being located in a central and/or radially outer cross-sectional portion of said main body.

2. Sealing ring according to claim 1, wherein the cross-section of the steel ring is composed of at least three thinner threads which on prefabrication are coated with a bonding agent and spun around a rigid core to form a unitary ring body where the individual threads are mutually connected to each other.

3. Sealing ring according to claim 1, wherein the outer surface of the main body has at least two mutually parallel rib formations coaxially of the sealing ring.

4. Sealing ring according to claim 3, wherein the main body is provided with
   (a) two mutually parallel, annular rib formations disposed one on each respective side of a radial plane through the steel ring,
   (b) two oppositely directed rib formations one at each ring edge, and
   (c) a rib formation directed radially inwards which forms the main sealing surface of the sealing ring against the insert end of the pipe joint.

5. Sealing ring according to claim 3, wherein the main body is provided with
   (a) a series of mutually parallel, radially relatively short rib formations on the outer surface of the sealing ring, and
   (b) a relatively elongate, lip seal-forming rib formation on the inner surface of the sealing ring, said rib formation projecting obliquely inwards from one edge of the sealing ring over towards the opposite edge of the sealing ring.

6. In combination,
   a first pipe having an insert end with an external diameter (D);
   a second pipe having a socket end disposed over said insert end, said socket end having an annular interior groove therein; and
   a sealing ring sealingly disposed in said groove and against said insert end, said sealing ring including an annular body of elastically yielding material and a rigid reinforcing ring within said body, said body having an external diameter between $1.08D + 16$ millimeters and $1.04D + 8$ millimeters and said reinforcing ring having a thickness between $0.01 D + 2$ millimeters and $0.05 D + 1$ millimeter.

7. The combination as set forth in claim 6 wherein said reinforcing ring is disposed in a central portion of said body.

8. The combination as set forth in claim 6 wherein said first pipe has an external diameter (D) of from 50 millimeters to 2000 millimeters.

9. The combination as set forth in claim 6 wherein said reinforcing ring is of circular cross-section.

* * * * *

UNITED STATES PATENT AND TRADEMARK OFFICE
CERTIFICATE OF CORRECTION

PATENT NO. : 4,368,894
DATED : January 18, 1983
INVENTOR(S) : Gunnar Parmann

It is certified that error appears in the above—identified patent and that said Letters Patent is hereby corrected as shown below:

Column 1, line 68, after "case" insert a --,--

Column 2, line 3, after "solutions" delete "consist in" and insert --reside in providing--

Column 2, line 16, after "Further" insert --,--

Column 2, line 28, change "have" to --having--

Column 6, line 49, change "breaths" to --breadths--

Signed and Sealed this

Tenth Day of May 1983

[SEAL]

Attest:

GERALD J. MOSSINGHOFF

*Attesting Officer*  *Commissioner of Patents and Trademarks*